US006268442B1

(12) United States Patent
Gustafsson et al.

(10) Patent No.: US 6,268,442 B1
(45) Date of Patent: Jul. 31, 2001

(54) PROCESS FOR THE REDUCTION OF REACTOR FOULING

(75) Inventors: Bill Gustafsson, Stenungsund; Ruth Dammert, Västra Frölunda, both of (SE); Jussi Laurell, BorgÅ (FI); Erik van Praet, Veltem-Beisem (BE)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/391,431

(22) Filed: Sep. 8, 1999

Related U.S. Application Data

(63) Continuation of application No. PCT/SE98/01949, filed on Oct. 28, 1998.

(30) Foreign Application Priority Data

Nov. 18, 1997  (SE) ................................................... 9704217

(51) Int. Cl.[7] ................................ C08F 2/00; C08F 10/02
(52) U.S. Cl. ........................ 526/74; 526/194; 526/318.6; 526/329
(58) Field of Search .............................. 526/74, 194, 329, 526/318.6

(56) References Cited

U.S. PATENT DOCUMENTS

| | | |
|---|---|---|
| 3,646,155 | 2/1972 | Scott . |
| 3,749,629 | 7/1973 | Andrews et al. . |
| 4,117,195 | 9/1978 | Swarbrick et al. . |
| 4,286,023 | 8/1981 | Ongchin . |
| 4,297,310 | 10/1981 | Akutsu et al. . |
| 4,351,876 | 9/1982 | Doi et al. . |
| 4,397,981 | 8/1983 | Doi et al. . |
| 4,413,066 | 11/1983 | Isaka et al. . |
| 4,446,283 | 5/1984 | Doi et al. . |
| 4,456,704 | 6/1984 | Fukumara et al. . |
| 4,547,551 | 10/1985 | Bailey et al. . |
| 4,576,993 | 3/1986 | Tamplin et al. . |
| 4,795,482 | 1/1989 | Gioffre et al. . |
| 4,812,505 | 3/1989 | Topcik . |
| 4,970,278 | 11/1990 | Komabashiri et al. . |
| 5,047,468 | 9/1991 | Lee et al. . |
| 5,149,738 | 9/1992 | Lee et al. . |
| 5,200,477 | * 4/1993 | Baker et al. ............................ 526/74 |
| 5,270,407 | * 12/1993 | Takeuchi et al. ....................... 526/74 |
| 5,380,803 | 1/1995 | Coutant et al. . |
| 5,382,631 | 1/1995 | Stehling et al. . |
| 5,453,322 | 9/1995 | Keogh et al. . |
| 5,521,264 | 5/1996 | Mehra et al. . |
| 5,574,816 | 11/1996 | Yang et al. . |
| 5,580,493 | 12/1996 | Chu et al. . |
| 5,582,923 | 12/1996 | Kale et al. . |
| 5,718,974 | 2/1998 | Kmiec . |
| 5,719,218 | 2/1998 | Sarma . |
| 5,731,082 | 3/1998 | Gross et al. . |
| 5,736,258 | 4/1998 | Moy . |
| 5,798,427 | 8/1998 | Foster et al. . |
| 5,807,635 | 9/1998 | Cogen et al. . |
| 5,891,979 | 4/1999 | Dammert et al. . |

FOREIGN PATENT DOCUMENTS

| | | |
|---|---|---|
| 0 040 992 B1 | 5/1984 | (EP) . |
| 0 041 796 B1 | 8/1984 | (EP) . |
| 0 207 627 A2 | 1/1987 | (EP) . |
| 0 207 627 A3 | 1/1987 | (EP) . |
| 0 022 376 B1 | 3/1987 | (EP) . |
| 0 214 099 A2 | 3/1987 | (EP) . |
| 0 237 294 A2 | 9/1987 | (EP) . |
| 0 318 841 A2 | 6/1989 | (EP) . |
| 0 334 993 A2 | 10/1989 | (EP) . |
| 0 348 978 A2 | 1/1990 | (EP) . |
| 0 369 436 A2 | 5/1990 | (EP) . |
| 0 193 317 B1 | 9/1990 | (EP) . |
| 0 401 540 A2 | 12/1990 | (EP) . |
| 0460936 A1 | 12/1991 | (EP) . |
| 0 475 064 A1 | 3/1992 | (EP) . |
| 0 497 530 A2 | 8/1992 | (EP) . |
| 0 533 160 A1 | 3/1993 | (EP) . |
| 0 538 033 A1 | 4/1993 | (EP) . |
| 0535230 A1 | 4/1993 | (EP) . |
| 0 540 075 A1 | 5/1993 | (EP) . |
| 0 420 271 B1 | 12/1994 | (EP) . |
| 0 517 868 B1 | 11/1995 | (EP) . |
| 0 688 794 A1 | 12/1995 | (EP) . |
| 0 750 319 A1 | 12/1996 | (EP) . |
| 980788 | 4/1998 | (FI) . |
| 942369 | 11/1963 | (GB) . |
| 2 028 831 | 3/1980 | (GB) . |
| 63-279503 | 11/1988 | (JP) . |
| 353509 | 12/1992 | (JP) . |
| WO 91/09075 | 6/1991 | (WO) . |
| WO 92/12182 | 7/1992 | (WO) . |
| WO 92/13029 | 8/1992 | (WO) . |
| WO 95/10548 | 4/1995 | (WO) . |
| WO 97/03124 | 1/1997 | (WO) . |

OTHER PUBLICATIONS

JP 2–235740 abstract. Jujo Paper Co Ltd, Sep. 18, 1990, abstract, figure 1. Japan, vol. 14, No. 552, M–1056.

JP 06340036 A abstract. Goyo PaperWorking Co Ltd, Dec. 13, 1994. Japan, vol. 94, No. 12.

JP 01100803 A2 abstract. STN International, File Caplus, Caplus accession No. 1989:55983, Hitachi cable, Ltd.: "Hindered amine–containing crosslinked polyethylene electric insulators for cables and wires": Apr. 19, 1989.

JP 56065667 A abstract. Jun. 3, 1981.

(List continued on next page.)

Primary Examiner—Fred Teskin
(74) Attorney, Agent, or Firm—Merchant & Gould P.C.

(57) ABSTRACT

A process for the reduction of reactor fouling at radical initiated high pressure polymerisation of ethylene (co) polymers is described. The process is characterised in that an adhesion reducing silicon containing compound is added to the polymerisation reactor, preferably in an amount of 0.001–3% by weight, based on the amount of polymer produced. Preferably the silicon containing compound is hexadecyl trimethoxy silane.

10 Claims, No Drawings

OTHER PUBLICATIONS

WPI, Derwent Accession No. 90–326069, Jujo Paper Mfg KK: "Blank for paper container for food packaging—comprises paper board, thermoplastic layer laminated for outside of container and two resin layers contain deodorise," & JP A 2235740, 900918.

WPI, Derwent accession No. 77–85827Y, Sumitomo Chem Co. Ltd: "Straight chain ethylene copolymers preparation copolymerise ethylene, glycol mono–acrylate and ethylenically unsaturated monomer," JP A 52126495, 441024, DW7748.

Saikkonin, Mikka. "Extrusion of slotted core elements," *Wire Technology International*, Nov. 1995.

Williams et al., Polymer Letters, vol. 6, pp. 621–624 (1968).

International Search Report for PCT/SE94/00773 dated Mar. 14, 1995.

International Search Report for PCT/SE94/01028 dated Mar. 14, 1995.

International Search Report for PCT/SE96/00900 dated Oct. 14, 1996.

International Search Report for PcT/SE97/01197 dated Oct. 28, 1997.

International Search Report for PcT/SE98/00013 dated May 5, 1998.

International Search Report for PcT/SE98/01786 dated Feb. 2, 1999.

International Search Report for PCT/SE98/01894 dated Feb. 2, 1999.

International Search Report (revised) for PCT/SE98/01894 dated May 4, 1999.

International Search Report for PCT/SE98/01949 dated Feb. 24, 1999.

International–Type Search Report for search request No. SE98/00591 dated Jan 29, 1999.

* cited by examiner

PROCESS FOR THE REDUCTION OF REACTOR FOULING

This application is a continuation of international application number PCT/SE98/01949, filed Oct. 28, 1998, pending.

TECHNICAL FIELD

The present invention concerns anti-fouling, and more particularly a process for the reduction of reactor fouling at radical initiated high pressure polymerisation of ethylene (co)polymers.

TECHNICAL BACKGROUND

Polymerisation of ethylene homopolymers and copolymers (referred to below as ethylene (copolymers) by radical initiated high pressure polymerisation is well-known in the art. Generally, the polymerisation of the monomer(s) is carried out at a temperature of about 100–300° C. and at a pressure of about 100–300 MPa in the presence of a radical initiator in a polymerisation reactor. Usually the polymerisation is carried out continuously, preferably in a tubular reactor or a stirred tank reactor.

During polymerisation fouling of the reactor may occur, especially when copolymerising ethylene with polar comonomers. The fouling manifests itself as unstable and inhomogeneous production, with formation of gels and build up of polymer deposits on the inner surfaces of the reactor. The gels and polymer deposits, when released from the reactor surfaces will contaminate the final polymer and compromise its quality. Also, the unstable production due to fouling makes it difficult to produce a polymer with a consistent and reproducible quality. Although reactor fouling may occur when producing ethylene homopolymers as well as copolymers, as mentioned above, it is particularly pronounced in connection with polymerisation of copolymers of ethylene and polar comonomers which polymerise more easily than ethylene. By way of example such polar comonomers comprise α,β-unsaturated carboxylic acids having 3–8 carbon atoms, anhydrides thereof, or esters thereof with aliphatic alcohols having 1–8 carbon atoms, such as (meth)acrylic acid, methyl(meth)acrylate, ethyl (meth)acrylate, and butyl(meth)acrylate. The expression "(meth)acrylic acid" includes both acrylic acid and methacrylic acid. Similarly, "alkyl(meth)acrylate" includes alkyl acrylates as well as alkyl methacrylates. Other polar comonomers such as vinylesters of saturated carboxylic acids having 1–4 carbon atoms and in particular vinyl acetate are less prone to cause problems with reactor fouling. This is probably due to their lower reactivity which usually leaves some of the comonomer in the polymerisation mixture as a solvent. However, when making high molecular weight copolymers reactor fouling is encountered also with this type of comonomer. Examples of polar comonomers that normally do not cause fouling problems are unsaturated silane compounds, such as vinyl trimethoxy silane, vinyl triethoxysilane, gamma-(meth)acryloxypropyltrimethoxysilane and gamma-(meth)acryloxypropyltriethoxysilane.

The above-mentioned reactor fouling problem is more pronounced the higher the amount of polar comonomer is. Generally, fouling starts to be a problem already at a comonomer content of about 15% by weight, and at a comonomer content of about 20 to 25% by weight it is difficult to carry out polymerisation and recover the polymer due to heavy fouling of the reactor and contamination of the polymer. Thus, when polymerising ethylene and ethyl acrylate problems with fouling and unstable production start at about 15–16% by weight of ethyl acrylate and get increasingly more serious up to about 25% by weight of ethyl acrylate when fouling makes production almost impossible. Similarly, it is not possible to copolymerise ethylene and methyl acrylate at higher methyl acrylate contents than about 20% by weight.

It has been suggested to solve the problem of reactor fouling in different ways, e.g. by periodic reactor scraping and addition of additives such as adhesion inhibitors. According to EP-A-0,460,936 it is e.g. proposed to solve the problem by introducing into the copolymerisation reactor a solvent consisting essentially of methanol in an amount of 2–25% by weight of the total material flowing through the reactor. A disadvantage with the addition of methanol is that it acts as a chain transfer agent and reduces the molecular weight of the copolymer.

Although the solutions proposed by the prior art may alleviate the fouling problem to some degree, so far no truly effective solution has been disclosed. Because of the seriousness of the problem, an effective solution to the reactor fouling problem would be an important advantage both from a technical and economical point of view.

SUMMARY OF THE INVENTION

It is an object of the invention to overcome the disadvantages of the prior art and alleviate the above problem of reactor fouling at radical initiated high pressure (co)polymerisation of ethylene.

The object of the invention is achieved by carrying out the polymerisation in the presence of an adhesion reducing silicon containing compound.

The present invention thus provides a process for the reduction of reactor fouling at radical initiated high pressure polymerisation of ethylene (co)polymers, characterised in that an adhesion reducing silicon containing compound is added to the polymerisation reactor.

Further characteristics and advantages of the invention appear from the appended claims and the following description.

DETAILED DESCRIPTION OF THE INVENTION

Addition of the inventive silicon containing compounds eliminates reactor fouling already at very small amounts of addition to the polymerisation reactor. Generally, it is preferred to add the silicon containing compound in an amount of about 0.001–3% by weight, more preferably about 0.005–2% by weight, and still more preferably about 0.01–1% by weight, such as about 0.1–1% by weight, based on the weight of the polymer produced. The adhesion reducing silicon containing compound may be added in any suitable way to the reactor, e.g. continuously or batchwise; separately or together with the other polymerisation components (e.g. dissolved in a monomer); etc. Preferably the silicon containing compound is added continuously during the polymerisation together with one or more of the monomers to be polymerised. The point of addition of the silicon containing compound is preferably upstream (i.e. on the suction side) of the compressor feeding monomer(s) to the polymerisation reactor.

The addition of the silicon containing compound according to the invention makes possible stable polymerisation without reactor fouling. Particularly, the invention makes it possible to achieve stable polymerisation without reactor fouling when polymerising copolymers of ethylene and certain polar comonomers with higher contents of comonomer than has hitherto been possible. Thus, it is possible according to the invention to produce ethylene-methyl acrylate copolymers (EMA) with 30% by weight of methyl acrylate without any significant fouling. Further, an increased conversion rate, i.e. the percentage of the monomer(s) fed to the reactor that are polymerised, may be achieved according to the invention. As seen from Example 2 the conversion rate of about 30% without silicon compound present could be increased by about 1–2 percent units which is of great economical importance. As a further advantage of the present invention polymers having a higher molecular weight may be produced. Thus, according to the invention high molecular weight ethylene-vinyl acetate copolymers (EVA) having a melt flow rate (MFR) below about 0.3 may be produced in a stable fashion, while polymerisation of such high molecular weight EVA:s normally is so unstable due to reactor fouling as to be all but impossible.

Although the present invention is of particular advantage for the production of ethylene copolymers, it is also very favourable for the production of ethylene homopolymers where an improved and more uniform product quality may be obtained.

As mentioned above, the invention resides in adding an adhesion reducing silicon containing compound to the polymerisation reactor. By the expression "adhesion reducing silicon containing compound" used herein is meant a silicon containing compound that reduces the adhesion between the inner metal surface of the reactor and the polymer produced in the reactor during polymerisation.

In order to exert an adhesion reducing effect it is necessary that the silicon containing compound has affinity to the reactor wall material which usually is a metal. The compound should therefore contain one or more polar groups or functions that in some way tend to adhere to the reactor wall surface, i.e. to metal surfaces. Two types of silicon containing compounds that show such affinity are silanes and silicones.

Suitable silane compounds can be represented by the general formula $$R_k SiR'_m X_n$$

where k is 0–3, m is 0 or 1, n is 1–4, k+m+n=4

R which may be the same or different if more than one such group is present, is an alkyl, arylalkyl, alkylaryl or aryl group containing 1–20 carbon atoms, with the proviso that if more than one R group is present the total number of carbon atoms of the R groups is at most 30;

R' is —R"SiR$_p$X$_q$, where p is 0–2, q is 1–3, and p+q=3; R" is —(CH$_2$)$_r$Y$_s$(CH$_2$)t— where r and t independently are 1–3, s is 0 or 1 and Y is a difunctional heteroatomic group selected from —O—, —S—, —SO—, SO$_2$, —NH—, —NR— or —PR—, where R is as defined above;

X which may be the same or different if more than one such group is present, is an alkoxy, aryloxy, alkylaryloxy, or arylalkyloxy group containing 1–15 carbon atoms, with the proviso that if more than one X group is present the total number of carbon atoms is at most 40.

The alkyl moiety of the R group may be linear or branched.

The alkyl moiety of the X group may be linear or branched. Preferably, each X group has 1–8 carbon atoms, most preferably 1–4 carbon atoms. The most preferred X groups are alkoxy groups selected from methoxy, ethoxy, propoxy, and 1-butoxy.

The groups R and X may include heteroatomic substituents, but this is not preferred. Especially, acid groups or groups that may form acids on hydrolysis, like halogen or carboxylate substituents are not preferred, since the acids may cause corrosion problems in the reactor.

The most preferred silicon containing compound at present is hexadecyl trimethoxy silane, which is commercially available and a liquid at ambient (room) temperature.

As mentioned above, another type of preferred silicon containing compound that may be used in the present invention is silicones. Silicones is the common denomination for different types of polysiloxanes and have the general formula R'$_m$(SiR$_2$O)$_n$R'$_m$, where R and R' can be methyl or phenyl and n is 3, 4 or 5 if m is 0, i.e. when the compounds is cyclic and n is 2–20 if m is 1, i.e. if the compound is a straight chain one.

Generally, the silane or the silicone used should be a liquid, in order to be easily fed into the reactor, but also in order to form a thin film layer on the reactor walls Having described the present invention above it will now be illustrated by way of examples without in any way being limited thereto.

EXAMPLE 1

In a tube reactor for radical initiated, high-pressure polymerisation an ethylene-ethyl acrylate copolymer containing 15% by weight of ethyl acrylate and having a melt index (MI) of 6 g/10 min was produced. The polymerisation was carried out at a temperature of about 277–283° C. and a pressure of about 265 MPa. An adhesion reducing silicon containing compound (hexadecyl trimethoxysilane, HDTMS) was added to the reactor feed in an amount of 2750 ppm. The polymerisation was run for 1 h and was very stable which inter alia manifested itself in that the peak temperature was nearly constant, while during polymerisation without addition of HDTMS it fluctuated over a temperature range of about 10° C. The conversion rate at the polymerisation was 30%. After having added 2750 ppm HDTMS during 1 h polymerisation, the amount of HDTMS added was increased to 6500 ppm and the polymerisation was continued for another hour. This resulted in an even more stable peak temperature. Then the addition of HDTMS was interrupted. At first the stable polymerisation continued, but after 2 to 2.5 h polymerisation without any further addition of HDTMS the peak temperature started to fluctuate and the polymerisation became unstable.

EXAMPLE 2

A polymerisation run was carried out in the same tube reactor as in Example 1 producing consecutively three ethylene-methyl acrylate copolymers containing different amounts of methyl acrylate: a) 14% by weight of methyl acrylate, MI=6 g/10 min; b) 18% by weight of methyl acrylate, MI=6 g/10 min; c) 25% by weight of methyl acrylate, MI=0.5 g/10 min. The reactor peak temperature was 235° C. and the reactor pressure was about 270 MPa.

The three different methyl acrylate polymers were produced during a single run by increasing the methyl acrylate feed in steps two times. First a copolymer containing 14% of methyl acrylate was produced and then the methyl acrylate feed was increased so that a copolymer with 18% of methyl acrylate was produced. At last the methyl acrylate feed was increased again so that a copolymer with 25% content of methyl acrylate was produced. In each run HDTMS was added as an adhesion reducing organic silicon containing compound. For the first two copolymers (14% by weight of methyl acrylate and 18% by weight of methyl acrylate, respectively) the amount of HDTMS added was 2500 ppm based on the polymer produced. For the third polymer (25% by weight of methyl acrylate) the amount of HDTMS was 4500 ppm based on the polymer produced. The effect of the HDTMS addition was noted about 0.5 to 1 h after the addition of HDTMS had started, and extremely stable reactor conditions were achieved with stable peak temperature and no indications of reactor fouling. No difference in effect was observed for the different amounts of HDTMS added. The rate of conversion at the polymerisation was 33% for the ethylene-methyl acrylate copolymers containing 14% and 18% by weight of methyl acrylate as compared with 29–30% in a similar run without HDTMS addition. When interrupting the addition of HDTMS the polymerisation temperature became more unstable after about 0.5 to 1 h further polymerisation. In this connection it should be added that normally, polymerisation of ethylene-methyl acrylate copolymers containing more than about 20% by weight of methyl acrylate is very difficult and often results in polymer plugs in the reactor causing pressure peaks with accompanying decompression of the reactor and a run-away reaction. No such problem was observed during polymerisation of the ethylene-methyl acrylate copolymer containing 25% by weight of methyl acrylate when the polymerisation was carried out in the presence of HDTMS.

What is claimed is:

1. A process for the reduction of reactor fouling at radical initiated polymerization of ethylene (co)polymers at a pressure of about 100–300 MPa comprising the step of adding an adhesion reducing silicon containing compound to the polymerization reactor.

2. A process according to claim 1, wherein 0.001–3% by weight of the silicon containing compound is added based on the amount of polymer produced.

3. A process according to claim 1, wherein the silicon containing compound is a silane compound.

4. A process according to claim 3, wherein the silane compound has the general formula $$R_k SiR'_m X_n$$

where k is 0–3, m is 0 or 1, n is 1–4, k+m+n=4

R which may be the same or different if more than one such group is present, is an alkyl, arylalkyl, alkylaryl or aryl group containing 1–20 carbon atoms, with the proviso that if more than one R group is present the total number of carbon atoms of the R groups is at most 30;

R' is —R"SiR$_p$X$_q$, where p is 0–2, q is 1–3, and p+q=3; R" is —(CH$_2$)$_r$Y$_s$(CH$_2$)t— where r and t independently are 1–3, s is 0 or 1 and Y is selected from —O—, —S—, —SO—, —SO$_2$—, —NH—, —NR— or —PR—, where R is as previously defined;

X which may be the same or different if more than one such group is present, is an alkoxy, aryloxy, alkylaryloxy, or arylalkyloxy group containing 1–15 carbon atoms, with the proviso that if more than one X group is present the total number of carbon atoms in the alkyl moieties is at most 40.

5. A process according to claim 4, wherein X is selected from methoxy, ethoxy, propoxy and 1-butoxy.

6. A process according to claims 1, wherein the silicon containing compound is hexadecyl trimethoxy silane.

7. A process according to claim 1, wherein the silicon containing compound is a silicone compound with the general formula $$R'_m(SiR_2O)_n R'_m$$

where R and R' is methyl or phenyl and n is 3, 4 or 5 if m is 0, and n is 2–20 if m is 1.

8. A process according to claim 1, wherein the polymerisation is a copolymerisation of ethylene and a polar comonomer.

9. A process according to claim 8, wherein the polar comonomer is selected from (meth)acrylic acid and esters thereof.

10. A process according to claim 9, wherein the polar comonomer is selected from methyl acrylate, ethyl acrylate and butyl acrylate.

* * * * *